United States Patent
Ishikawa et al.

(10) Patent No.: US 8,906,573 B2
(45) Date of Patent: Dec. 9, 2014

(54) REINFORCED SOLID POLYMER ELECTROLYTE COMPOSITE MEMBRANE, MEMBRANE ELECTRODE ASSEMBLY FOR SOLID POLYMER FUEL CELL, AND SOLID POLYMER FUEL CELL

(75) Inventors: Masahiko Ishikawa, Tokyo (JP); Tomoyuki Takane, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 1032 days.

(21) Appl. No.: 12/672,131

(22) PCT Filed: Aug. 8, 2008

(86) PCT No.: PCT/JP2008/064606
§ 371 (c)(1),
(2), (4) Date: Dec. 1, 2010

(87) PCT Pub. No.: WO2009/022728
PCT Pub. Date: Feb. 19, 2009

(65) Prior Publication Data
US 2011/0070521 A1   Mar. 24, 2011

(30) Foreign Application Priority Data
Aug. 10, 2007   (JP) .................. 2007-210076

(51) Int. Cl.
*H01M 8/10* (2006.01)
*H01M 8/02* (2006.01)
*H01M 8/06* (2006.01)

(52) U.S. Cl.
CPC .......... *H01M 8/1016* (2013.01); *H01M 8/0289* (2013.01); *H01M 8/0293* (2013.01); *H01M 8/0637* (2013.01); *H01M 2300/0094* (2013.01); *Y02E 60/521* (2013.01)

USPC .................... 429/483; 429/492; 429/479

(58) Field of Classification Search
USPC ........... 429/465, 479, 480, 483, 492; 502/101
See application file for complete search history.

(56) References Cited

U.S. PATENT DOCUMENTS

| 2004/0043283 A1 | 3/2004 | Cipollini et al. ............... 429/40 |
| 2006/0019140 A1 | 1/2006 | Kawazoe et al. ............... 429/33 |

(Continued)

FOREIGN PATENT DOCUMENTS

| EP | 2 144 318 A1 | 1/2010 |
| JP | 2001-118591 | 4/2001 |

(Continued)

OTHER PUBLICATIONS

Machine Translation of: JP 2007/095433 A, Endo et al., Apr. 12, 2007.*

(Continued)

*Primary Examiner* — Kenneth Douyette
(74) *Attorney, Agent, or Firm* — Allan M. Wheatcraft

(57) ABSTRACT

The invention provides a solid polymer fuel cell whose operational stability over time has been enhanced. A reinforced solid polymer electrolyte composite membrane for a solid polymer fuel cell according to the present invention comprises two or more polymer electrolyte membranes and one or more layers of a sheet-like porous reinforcing member, wherein the polymer electrolyte membranes provide both the upper and lower surfaces of the composite membrane, and pores in the sheet-like porous reinforcing member are substantially filled with the electrolyte from the polymer electrolyte membranes, and wherein the sheet-like porous reinforcing member contains a peroxide decomposition catalyst.

11 Claims, 3 Drawing Sheets

(56) References Cited

U.S. PATENT DOCUMENTS

| | | | |
|---|---|---|---|
| 2007/0087245 A1 | 4/2007 | Fuller | 429/33 |
| 2010/0009236 A1 | 1/2010 | Kotera et al. | |
| 2010/0233571 A1 | 9/2010 | Takeshita | |

FOREIGN PATENT DOCUMENTS

| | | |
|---|---|---|
| JP | 2005-019232 | 1/2005 |
| JP | 2005-050561 | 2/2005 |
| JP | 2005-216667 | 8/2005 |
| JP | 2005-276747 | 10/2005 |
| JP | 2006-049002 | 2/2006 |
| JP | 2006-107914 | 4/2006 |
| JP | 2006-302578 | 11/2006 |
| JP | 2007-048471 | 2/2007 |
| JP | 2007-095433 | 4/2007 |
| JP | 2008-204928 | 9/2008 |
| WO | WO97/41168 | 11/1997 |
| WO | WO 2007/108950 | 9/2007 |

OTHER PUBLICATIONS

Supplementary European Search Report EP 08792483 dated Jul. 29, 2011.

\* cited by examiner

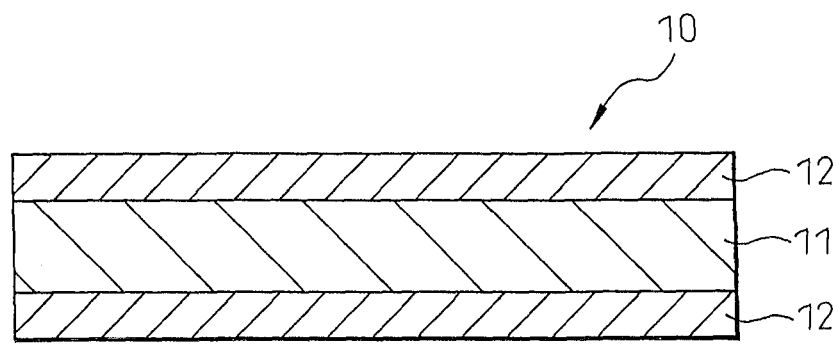
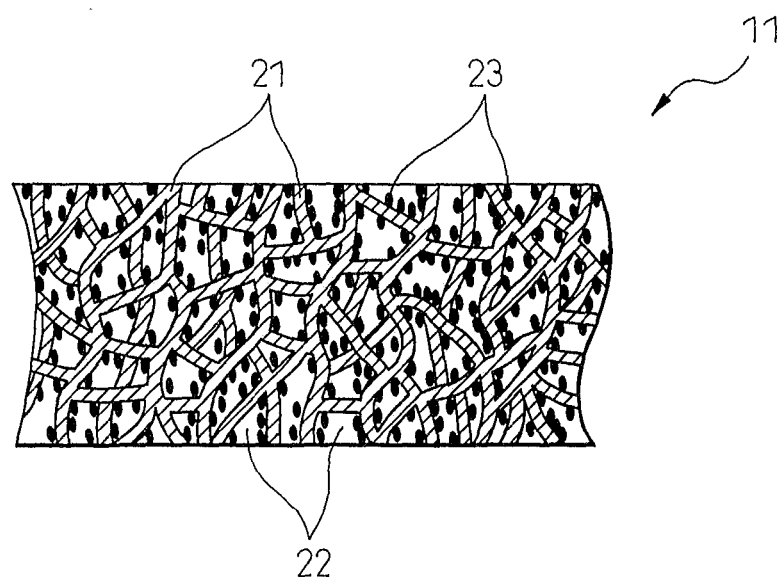

REINFORCED SOLID POLYMER ELECTROLYTE COMPOSITE MEMBRANE, MEMBRANE ELECTRODE ASSEMBLY FOR SOLID POLYMER FUEL CELL, AND SOLID POLYMER FUEL CELL

TECHNICAL FIELD

The present invention relates to a reinforced solid polymer electrolyte composite membrane, a membrane electrode assembly for use in a solid polymer fuel cell, and a solid polymer fuel cell.

BACKGROUND ART

In recent years, fuel cells have been attracting attention as high-efficiency energy conversion devices. Fuel cells are roughly classified into two categories based on the type of the electrolyte used: low-temperature operating fuel cells, such as alkaline fuel cells, solid polymer electrolyte fuel cells, and phosphoric acid fuel cells; and high-temperature operating fuel cells, such as molten carbonate fuel cells and solid oxide fuel cells. Among them, the solid polymer electrolyte fuel cell (PEFC) that uses an ionically conductive polymer electrolyte membrane as an electrolyte has been receiving attention as a power supply source for stationary use, automotive use, portable use, etc., because it is compact in construction, achieves high output density, does not use a liquid for the electrolyte, can operate at low temperatures, and can therefore be implemented in a simple system.

The basic principle of the solid polymer electrolyte fuel cell is that, with gas diffusion electrode layers disposed on both sides of the polymer electrolyte membrane, whose anode side is exposed to a fuel gas (hydrogen or the like) and whose cathode side to an oxidizer gas (air or the like), water is synthesized by a chemical reaction occurring across the polymer electrolyte membrane, and the resulting reaction energy is extracted as electrical energy. Since the oxygen reduction reaction occurring as a side reaction at the cathode of the solid polymer electrolyte fuel cell proceeds while producing hydrogen peroxide ($H_2O_2$) in the process, there is concern that the electrolyte constituting the cathode electrode layer and the polymer electrolyte membrane adjacent to it may suffer degradation due to the hydrogen peroxide or peroxide radicals generated at the cathode electrode layer. At the anode also, if a phenomenon (crossover) occurs in which oxygen molecules permeate the polymer electrolyte membrane from the cathode side, hydrogen peroxide or peroxide radicals may likewise be generated, which can lead to the degradation of the electrolyte constituting the anode electrode layer.

To prevent the degradation of the polymer electrolyte membrane due to the peroxide generated at the electrode layers, it is known to provide a high durability solid polymer electrolyte in which a transition metal oxide having a catalytic ability to decompose the peroxide on contact, such as, among others, manganese oxide, ruthenium oxide, cobalt oxide, nickel oxide, chromium oxide, iridium oxide, or lead oxide, is dispersed through the polymer electrolyte membrane (Japanese Unexamined Patent Publication No. 2001-118591). It is also known to provide a sulfonic acid group-containing polymer electrolyte membrane for use in a solid polymer fuel cell, in which fine particles of a hardly-soluble compound of cerium are added into the polymer electrolyte membrane in order to increase its resistance to hydrogen peroxide or peroxide radicals (Japanese Unexamined Patent Publication No. 2006-107914).

As an electrolyte membrane for use in a solid polymer fuel cell, there is also proposed a polymer electrolyte membrane that contains cerium ions or manganese ions and that is reinforced by a porous membrane, etc., in order to enhance durability against hydrogen peroxide or peroxide radicals while also increasing the mechanical strength of the electrolyte membrane (Japanese Unexamined Patent Publication No. 2007-95433). The electrolyte membrane disclosed in Japanese Unexamined Patent Publication No. 2007-95433 can be produced by a method (1) in which a polymer compound membrane reinforced by a reinforcing structure is fabricated by molding and the membrane is then immersed in a solution of cerium ions, etc., a method (2) in which cerium ions, etc., are added in a solution of a polymer compound, which is then formed, together with a reinforcing structure, into the shape of a membrane by casting, or a method (3) in which cerium ions, etc., are added in a solution of a polymer compound, which is then formed into the shape of a membrane by casting, and the resulting membrane is placed on at least one side of a reinforcing structure and laminated together under heat and pressure.

DISCLOSURE OF THE INVENTION

The polymer electrolyte membranes disclosed in the above patent documents contain a peroxide decomposition catalyst in order to enhance their durability against peroxide. It should be noted here that, in the case of a polymer electrolyte membrane used in a solid polymer fuel cell, since the polymer electrolyte membrane is held in a wet condition during operation and held in a relatively dry condition when not in operation, the polymer electrolyte membrane is repeatedly subjected to swelling and shrinking during the wet/dry cycle associated with the starting and stopping of the operation. Further, in the case of a solid polymer fuel cell used in cold areas, the polymer electrolyte membrane may repeatedly undergo deformation during the freeze/defreeze cycle as freezing can occur when the operation is stopped. Such deformation of the electrolyte membrane associated with the wet/dry cycle or the freeze/defreeze cycle can lead to stress concentration on the peroxide decomposition catalyst contained in the electrolyte membrane, resulting in breakage of the electrolyte membrane after a long time use of the fuel cell. Further, if the peroxide decomposition catalyst contained in the polymer electrolyte membrane is particulate (Japanese Unexamined Patent Publication Nos. 2001-118591 and 2006-107914), there arises the problem that the catalyst particles sticking from the surface of the polymer electrolyte membrane impair the adhesion of the polymer electrolyte membrane to other members, such as an electrode layer and gasket, that constitute the solid polymer fuel cell. On the other hand, if the peroxide decomposition catalyst contained in the polymer electrolyte membrane is in the form of ions (Japanese Unexamined Patent Publication No. 2007-95433), proton conductivity drops due to ion exchange with polymer electrolyte anions, eventually leading to degradation of the power generation performance of the solid polymer fuel cell.

Accordingly, it is an object of the present invention to improve the operational stability over time of a solid polymer fuel cell by enhancing the mechanical durability against the wet/dry cycle, etc., of a polymer electrolyte membrane that contains a peroxide decomposition catalyst in order to increase its durability against peroxide. It is another object of the present invention to enhance the adhesion of a polymer electrolyte membrane to other constituent members of a solid polymer fuel cell when the polymer electrolyte membrane contains a peroxide decomposition catalyst in order to increase its durability against peroxide.

The present invention provides:

(1) a reinforced solid polymer electrolyte composite membrane for a solid polymer fuel cell, comprising two or more polymer electrolyte membranes and one or more layers of a sheet-like porous reinforcing member, wherein the polymer electrolyte membranes provide both the upper and lower surfaces of the composite membrane, and pores in the sheet-like porous reinforcing member are substantially filled with the electrolyte from the polymer electrolyte membranes, and wherein the sheet-like porous reinforcing member contains a peroxide decomposition catalyst;

(2) a reinforced solid polymer electrolyte composite membrane as described in item (1), wherein the two or more polymer electrolyte membranes have different thicknesses from each other;

(3) a reinforced solid polymer electrolyte composite membrane as described in item (1) or (2), wherein the composite membrane includes the sheet-like porous reinforcing member in two or more layers, at least one of which contains the peroxide decomposition catalyst;

(4) a reinforced solid polymer electrolyte composite membrane as described in any one of items (1) to (3), wherein the sheet-like porous reinforcing member comprises porous expanded polytetrafluoroethylene;

(5) a reinforced solid polymer electrolyte composite membrane as described in any one of items (1) to (4), wherein the peroxide decomposition catalyst is attached to the surfaces of the sheet-like porous reinforcing member or to the interior surfaces of the pores;

(6) a reinforced solid polymer electrolyte composite membrane as described in any one of items (1) to (5), wherein the peroxide decomposition catalyst is dispersed through the electrolyte filled into the pores of the sheet-like porous reinforcing member;

(7) a reinforced solid polymer electrolyte composite membrane as described in any one of items (1) to (6), wherein the peroxide decomposition catalyst comprises ions of at least one transition element or rare earth element selected from the group consisting of cerium, manganese, tungsten, zirconium, titanium, vanadium, yttrium, lanthanum, neodymium, nickel, cobalt, chromium, molybdenum, and iron, or at least one compound containing the transition element or rare earth element;

(8) a reinforced solid polymer electrolyte composite membrane as described in item (7), wherein the peroxide decomposition catalyst comprises cerium ions or a compound containing cerium;

(9) a membrane electrode assembly for use in a solid polymer fuel cell, constructed by bonding a cathode layer to one surface of a solid polymer electrolyte composite membrane as described in any one of items (1) to (8), and an anode layer to the other surface thereof;

(10) a membrane electrode assembly for use in a solid polymer fuel cell as described in item (9), wherein the two or more polymer electrolyte membranes have different thicknesses, and the cathode layer is bonded to the thinner polymer electrolyte membrane;

(11) a membrane electrode assembly for use in a solid polymer fuel cell as described in item (9), wherein the solid polymer electrolyte composite membrane includes the sheet-like porous reinforcing member in two or more layers, of which at least one layer nearer to the cathode layer contains the peroxide decomposition catalyst;

(12) a membrane electrode assembly for use in a solid polymer fuel cell as described in item (9), wherein the solid polymer electrolyte composite membrane includes the sheet-like porous reinforcing member in two or more layers, of which the sheet-like porous reinforcing member nearest to the cathode layer contains the peroxide decomposition catalyst; and

(13) a solid polymer fuel cell comprising a membrane electrode assembly as described in any one of items (9) to (12).

According to the present invention, since the peroxide decomposition catalyst is loaded only into the sheet-like porous reinforcing member of the solid polymer electrolyte composite membrane reinforced by the sheet-like porous reinforcing member, the mechanical durability against the wet/dry cycle, etc., increases, which serves to enhance the operational stability over time of the solid polymer fuel cell. Furthermore, since the polymer electrolyte membranes provide both the upper and lower surfaces of the solid polymer electrolyte composite membrane, the surfaces of the composite membrane are substantially free from irregularities, and the adhesion of the polymer electrolyte membranes to the other constituent members of the solid polymer fuel cell can thus be enhanced.

BRIEF DESCRIPTION OF THE DRAWINGS

FIG. 1 is a diagram schematically showing a vertical cross section of a solid polymer electrolyte composite membrane according to one mode of the present invention;

FIG. 2 is a diagram schematically showing a vertical cross section of a sheet-like porous reinforcing member containing a peroxide decomposition catalyst;

BEST MODE FOR CARRYING OUT THE INVENTION

Figure 3:
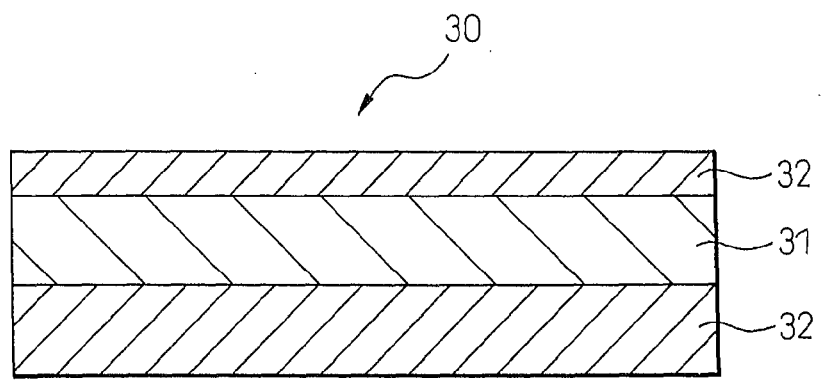
FIG. 3 is a diagram schematically showing a vertical cross section of a solid polymer electrolyte composite membrane according to an alternative mode of the present invention.

A reinforced solid polymer electrolyte composite membrane for a solid polymer fuel cell according to the present invention comprises two or more polymer electrolyte membranes and one or more layers of a sheet-like porous reinforcing member, wherein the polymer electrolyte membranes provide both the upper and lower surfaces of the composite membrane, and pores in the sheet-like porous reinforcing member are substantially filled with the electrolyte from the polymer electrolyte membranes, and wherein the sheet-like porous reinforcing member contains a peroxide decomposition catalyst.

The basic mode of the reinforced solid polymer electrolyte composite membrane according to the present invention is shown in FIG. 1. In FIG. 1, the reinforced solid polymer electrolyte composite membrane 10 comprises two layers of polymer electrolyte membrane 12 forming both the upper and lower surfaces of the composite membrane, and a single layer of sheet-like porous reinforcing member 11. FIG. 2 is a diagram schematically showing a vertical cross section of the sheet-like porous reinforcing member 11. The sheet-like porous reinforcing member 11 comprises a reinforcing member body 21 and pores 22, and the pores 22 are substantially filled with the electrolyte from the polymer electrolyte membranes 12. In the mode shown in FIG. 2, a peroxide decomposition catalyst 23 is attached to the interior surfaces of the pores 22 of the sheet-like porous reinforcing member 11. In an alternative mode, the peroxide decomposition catalyst 23 may be dispersed through the polymer electrolyte filled into the pores of the sheet-like porous reinforcing member 11.

Figure 4:
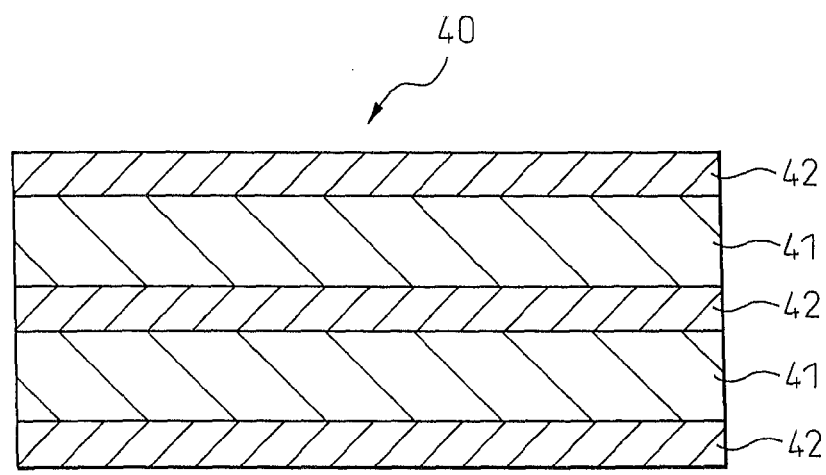
FIG. 4 is a diagram schematically showing a vertical cross section of a solid polymer electrolyte composite membrane according to an alternative mode of the present invention.

In the reinforced solid polymer electrolyte composite membrane 10 according to the present invention shown in FIG. 1, the two layers of polymer electrolyte membrane 12 have substantially the same thickness. As an alternative mode, FIG. 3 shows a reinforced solid polymer electrolyte composite membrane 30 which includes two layers of polymer electrolyte membrane 32 having different thicknesses. The sheet-like porous reinforcing member 31 here also contains a peroxide decomposition catalyst. When fabricating a membrane electrode assembly using the solid polymer electrolyte composite membrane 30, if the cathode layer is bonded to the thinner polymer electrolyte membrane, as will be described later, the hydrogen peroxide or peroxide radicals generated at the cathode layer can be effectively scavenged. The reinforced solid polymer electrolyte composite membrane according to the present invention may include two or more layers of the sheet-like porous reinforcing member. FIG. 4 shows a solid polymer electrolyte composite membrane 40 which includes two layers of the sheet-like porous reinforcing member 41. The two layers of sheet-like porous reinforcing member 41, at least one of which contains a peroxide decomposition catalyst, may have the same thickness or different thicknesses. The solid polymer electrolyte composite membrane 40 shown in FIG. 4 includes three layers of polymer electrolyte membrane 42 having substantially the same thickness, but the polymer electrolyte membranes 42 may have different thicknesses. For example, the polymer electrolyte membranes 42 forming the upper and lower surfaces of the polymer electrolyte composite membrane 40 may be made thinner, and the internal polymer electrolyte membrane 42 may be made thicker; then, when the membrane electrode assembly is fabricated using such a composite membrane, the hydrogen peroxide or peroxide radicals generated at the cathode layer and/or the anode layer can be effectively scavenged. In the case of a composite membrane containing three or more layers of the sheet-like porous reinforcing member, any person skilled in the art can appropriately determine, based on the teachings of the present application, which of the sheet-like porous reinforcing members should be chosen to contain the peroxide decomposition catalyst and what thicknesses the polymer electrolyte membranes sandwiching the respective sheet-like porous reinforcing members should be provided with. The component members of the reinforced solid polymer electrolyte composite membrane according to the present invention will be described in further detail below.

The polymer electrolyte membrane to be used in the present invention is not specifically limited, but any known polymer electrolyte membrane can be used, as long as it has high proton ($H^+$) conductivity, is electronically insulative, and is gas-impermeable. A typical example is a resin that has a fluorine-containing polymer as the backbone and has a group such as a sulfonic acid group, a carboxyl group, a phosphoric acid group, a phosphonate group, etc. Since the thickness of the polymer electrolyte membrane greatly affects resistance, it is required that the thickness be made as small as possible, as long as it does not impair the electronic insulation and gas impermeability; specifically, the thickness is chosen to fall within the range of 1 to 50 μm, and preferably within the range of 1 to 20 μm. The material for the polymer electrolyte membrane used in the present invention is not limited to a fully fluorinated polymer compound, but use may be made of a mixture with a hydrocarbon-based polymer compound or an inorganic polymer compound, or of a partially fluorinated polymer compound containing both C—H and C—F bonds in the polymer chain. Specific examples of the hydrocarbon-based polymer electrolyte include: polyamide, polyacetal, polyethylene, polypropylene, acrylic resin, polyester, polysulfone, polyether, etc., into which an electrolyte group such as a sulfonic acid group is introduced, and their derivatives (aliphatic hydrocarbon-based polymer electrolyte); polystyrene into which an electrolyte group such as a sulfonic acid group is introduced, polyamide, polyamideimide, polyimide, polyester, polysulfone, polyetherimide, polyethersulfone, polycarbonate, etc., having an aromatic ring, and their derivatives (partially aromatic hydrocarbon-based polymer electrolyte); and polyether-etherketone, polyehterketone, polyethersulfone, polycarbonate, polyamide, polyamideimide, polyester, polyphenylene sulfide, etc., into which an electrolyte group such as a sulfonic acid group is introduced, and their derivatives (fully aromatic hydrocarbon-based polymer electrolyte). Specific examples of the partially fluorinated polymer electrolyte include a polystyrene-graft-ethylenetetrafluoroethylene copolymer, polystyrene-graft-polytetrafluoroethylene copolymer, etc., into which an electrolyte group such as a sulfonic acid group is introduced, and their derivatives. Specific examples of the fully fluorinated polymer electrolyte include a Nafion (registered trademark) membrane (manufactured by DuPont), which is a perfluoro polymer having a sulfonic acid group as a side chain, an Aciplex (registered trademark) membrane (manufactured by Asahi Kasei), and a Flemion (registered trademark) membrane (manufactured by Asahi Glass). For the inorganic polymer compound, a siloxane- or silane-based, in particular, alkylsiloxane-based, organic silicon polymer compound is preferable, specific examples including polydimethyl siloxane, γ-glycidoxypropyltrimetoxysilane, etc.

For the sheet-like porous reinforcing member in the present invention, any known material may be used as long as it can reinforce the solid polymer electrolyte membrane and does not impair the effect and operation of the electrolyte membrane in its specific application. For example, woven fabric, nonwoven fabric, porous membrane, or porous sheet described in JP-A-2007-95433 may be suitably chosen for use as the sheet-like porous reinforcing member. When using the reinforced solid polymer electrolyte composite membrane according to the present invention in a solid polymer fuel cell, it is preferable to use a porous expanded PTFE as the sheet-like porous reinforcing member. More specifically, it is preferable to use a porous expanded PTFE having a porosity of 35% or higher, and more preferably a porosity of 50 to 97%. If the porosity is less than 35%, the amount of the polymer electrolyte impregnated therein is not sufficient and, in solid polymer fuel cell applications, for example, sufficient power generation performance cannot be obtained. Conversely, if the porosity exceeds 97%, sufficient reinforcement cannot be provided to the solid polymer electrolyte membrane. The average pore size of the porous expanded PTFE is generally in the range of 0.01 to 50 μm, preferably in the range of 0.05 to 15 μm, and more preferably in the range of 0.1 to 3 μm. If the average pore size is smaller than 0.01 μm, the melt infiltration of the polymer electrolyte precursor to be described later becomes difficult. Conversely, if the average pore size exceeds 50 μm, sufficient reinforcement cannot be provided to the solid polymer electrolyte membrane. The thickness of the porous expanded PTFE is generally in the range of 1 to 30 μm, and preferably in the range of 2 to 20 μm. The porous expanded PTFE preferable for use as the sheet-like porous reinforcing member in the present invention is commercially available from Japan Gore-Tex Inc.

The peroxide decomposition catalyst to be used in the present invention is not particularly limited, the only requirement being that it can quickly decompose peroxide, especially, hydrogen peroxide, generated during the operation of the solid polymer fuel cell. Examples of such a peroxide decomposition catalyst include a compound containing a transition element or rare earth element selected from the group consisting of cerium (Ce), manganese (Mn), tungsten (W), zirconium (Zr), titanium (Ti), vanadium (V), yttrium (Y), lanthanum (La), neodymium (Nd), nickel (Ni), cobalt (Co), chromium (Cr), molybdenum (Mo), and iron (Fe). It is preferable that the peroxide decomposition catalyst is a compound containing cerium, in particular, an oxide. The amount of the peroxide decomposition catalyst to be added is generally chosen to be in the range of 0.01 to 80% by mass, preferably in the range of 0.05 to 50% by mass, and more preferably in the range of 1 to 20% by mass, relative to the material of the sheet-like porous reinforcing member. Since the peroxide decomposition catalyst has low ionic conductivity, if it is added in an amount greater than 80% by mass, it will impair the ionic conductivity of the solid polymer electrolyte composite membrane, which is not desirable. Conversely, if the amount of the peroxide decomposition catalyst added is smaller than 0.01% by mass, the catalytic ability to decompose the peroxide drops, and the intended purpose cannot be accomplished.

When the peroxide decomposition catalyst to be loaded into the sheet-like porous reinforcing member is particulate, the particle size is not specifically limited but can be appropriately determined by considering the pore size of the sheet-like porous reinforcing member. For example, if the particle size of the peroxide decomposition catalyst is too large, the dispersibility of the catalyst may decrease, or the catalyst may not be sufficiently impregnated into the sheet-like porous reinforcing member. It is therefore desirable that the particle size of the peroxide decomposition catalyst be about 3 μm or less. Further, in view of the fact that, when the amount of the peroxide decomposition catalyst added is the same, the catalytic activity increases as the surface area increases, preferably the particle size should be chosen to be about 0.5 μm or less.

In a first method for forming the reinforced solid polymer electrolyte composite membrane according to the present invention, first in order to load the peroxide decomposition catalyst into the sheet-like porous reinforcing member a solution or dispersion of a compound containing the above-mentioned transition metal element or rare earth element is caused to infiltrate into the sheet-like porous reinforcing member, after which the solvent or the dispersion medium is removed by drying, leaving the peroxide decomposition catalyst attached to the surfaces of the sheet-like porous reinforcing member or to the interior surfaces of the pores. For the solvent or the dispersion medium, methanol, ethanol, propanol, decanol, ethylene glycol, xylene, toluene, naphthalene, water, etc., or a combination thereof may be used. By adding a penetrant as needed to the solvent or the dispersion medium, the penetration of the peroxide decomposition catalyst into the pores can be promoted. Examples of such penetrants include Triton X, sodium dodecylbenzenesulfonate, nonylphenol EO adduct, perfluorooctyl ammonium sulfonate, perfluoro ammonium octanoate, etc. Next, in order to substantially fill the polymer electrolyte into the pores of the sheet-like porous reinforcing member containing the peroxide decomposition catalyst, a substrate such as an ethylenetetrafluoroethylene copolymer (ETFE) film is coated with a solution prepared by dissolving the polymer electrolyte in a solvent such as methanol, ethanol, propanol, decanol, ethylene glycol, xylene, toluene, naphthalene, water, etc., or a solvent formed from a suitable combination thereof, and the sheet-like porous reinforcing member is placed on the coating, thus impregnating the solution into the reinforcing member, after which the solvent or the dispersion medium is removed by drying. Then, the polymer electrolyte solution is further applied over the impregnated sheet-like porous reinforcing member and dried, to complete the fabrication of the solid polymer electrolyte composite membrane according to the present invention, with the polymer electrolyte membranes formed on the upper and lower surfaces thereof.

To prevent the peroxide decomposition catalyst attached to the surfaces of the sheet-like porous reinforcing member or to the interior surfaces of the pores from being detached from them, a binder may be added as needed in the solution or dispersion of the peroxide decomposition catalyst. For the binder, use may be made of a butyral resin, silicone resin, fluorine resin, etc., of which a fluorine resin is preferred for use from the viewpoint of durability. Examples of the fluorine resin include polyvinylidene fluoride, polyfluoroalkyl vinyl ether, fluorine-based rubber, etc. By adding such a binder in an amount not smaller than 0.5% by mass, and preferably not smaller than 1% by mass, relative to the material of the porous reinforcing member, the peroxide decomposition catalyst can be effectively prevented from being detached. On the other hand, in order to prevent the resistance of the resulting solid polymer electrolyte composite membrane from becoming too high, it is desirable to hold the amount of the binder so as not to exceed 10% by mass, and preferably so as not to exceed 5% by mass.

In a second method for forming the reinforced solid polymer electrolyte composite membrane according to the present invention, first the peroxide decomposition catalyst is loaded into the sheet-like porous reinforcing member in the same manner as in the first method; then, polymer electrolyte precursor membranes are placed on both surfaces of the sheet-like porous reinforcing member containing the peroxide decomposition catalyst, and laminated together under heat, to obtain a polymer electrolyte precursor composite membrane with the polymer electrolyte precursor caused to melt and infiltrate from both sides of the sheet-like porous reinforcing member. After that, the polymer electrolyte precursor is hydrolyzed and then acidified, to complete the fabrication of the solid polymer electrolyte composite membrane according to the present invention, with the polymer electrolyte membranes formed on the upper and lower surfaces thereof. For the polymer electrolyte precursor, a material is used that infiltrates into the sheet-like porous reinforcing member by melting at a temperature lower than the thermal decomposition temperature of the reinforcing member. More specifically, for the polymer electrolyte precursor, it is preferable to use a material whose melting temperature is generally in the range of 100 to 300° C., and preferably in the range of 100 to 250° C., and is lower than the thermal decomposition temperature of the sheet-like porous reinforcing member. Generally, a membrane with a thickness of 2 to 50 μm may be prepared for use as the polymer electrolyte precursor membrane. A preferred example of the polymer electrolyte precursor is one that contains a polymer expressed by the following general formula (1).

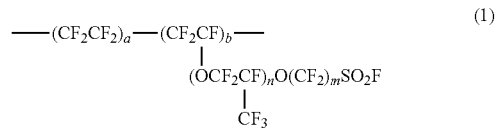

(1)

(In the above formula, a:b=1:1 to 9:1, a+b=100 or larger, m=2 to 6, n=0, 1, 2)

In the polymer electrolyte precursor expressed by the above general formula (1), the sulfonyl fluoride group ($-SO_2F$) at the end of the side chain is hydrolyzed with alkali, and is neutralized with an acid and converted to a sulfonic acid group ($-SO_3H$), thus transforming the precursor into a polymer electrolyte. In the second method, since the polymer electrolyte precursor is directly caused to melt and infiltrate into the sheet-like porous reinforcing member, no solvent whatsoever for producing a solution of polymer electrolyte precursor is used. As a result, compared with the first method that includes impregnating a solution of polymer electrolyte, microscopic gaps that would occur between the polymer electrolyte precursor and the porous reinforcing member when removing the solvent will not occur in the second method, which thus serves to increase the adhesion between the polymer electrolyte and the porous reinforcing member.

In a third method for forming the reinforced solid polymer electrolyte composite membrane according to the present invention, a substrate such as an ETFE film is coated with a solution prepared by dissolving the polymer electrolyte in the above solvent, and the coating is then dried; after that, the substrate is further coated with a polymer electrolyte solution to which the peroxide decomposition catalyst has been added, and the sheet-like porous reinforcing member is placed in contact with the coating, thus impregnating the solution into the reinforcing member, after which the solvent or the dispersion medium is removed by drying. In this method, the peroxide decomposition catalyst is dispersed through the polymer electrolyte filled into the pores of the sheet-like porous reinforcing member. Then, the polymer electrolyte solution is further applied over the impregnated sheet-like porous reinforcing member and dried, to complete the fabrication of the solid polymer electrolyte composite membrane according to the present invention, with the polymer electrolyte membranes formed on the upper and lower surfaces thereof.

Figure 5:
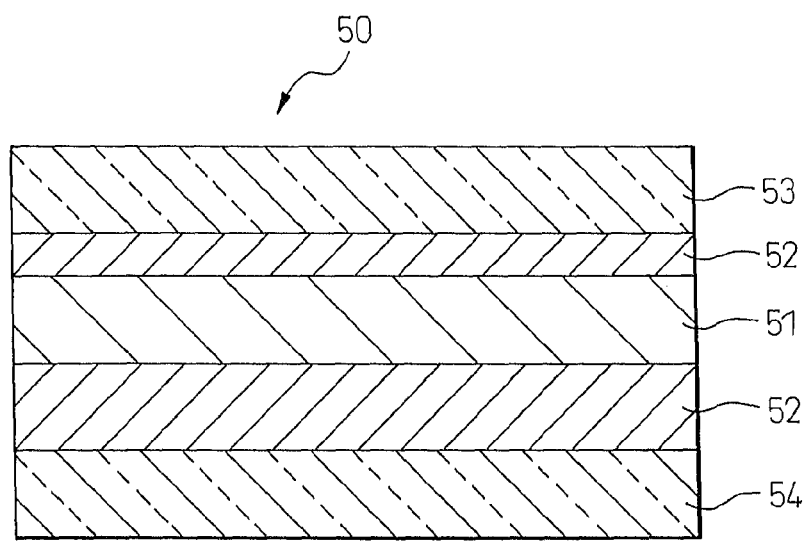
FIG. 5 is a diagram schematically showing a vertical cross section of a membrane electrode assembly according to one mode of the present invention.

By providing the electrode layers (cathode layer and anode layer) on the respective surfaces of the reinforced solid polymer electrolyte composite membrane according to the present invention, a membrane electrode assembly for a solid polymer fuel cell can be constructed. Since the polymer electrolyte membranes that do not contain any peroxide decomposition catalyst form the upper and lower surfaces of the solid polymer electrolyte composite membrane according to the present invention, the surfaces of the composite membrane are substantially free from irregularities, and the adhesion of the surfaces to the electrode layers is thus enhanced. As an example, FIG. 5 shows a schematic cross-sectional view of the membrane electrode assembly fabricated using the solid polymer electrolyte composite membrane 30 of FIG. 3. In FIG. 5, the sheet-like porous reinforcing member 51 and polymer electrolyte membrane 52 respectively correspond to the sheet-like porous reinforcing member 31 and polymer electrolyte membrane 32 shown in FIG. 3. The membrane electrode assembly 50 further includes the electrode layers 53 and 54. If the electrode layer 53 bonded to the thinner polymer electrolyte membrane 52 is set as the cathode layer, the hydrogen peroxide or peroxide radicals generated at the cathode layer can be effectively scavenged. Conversely, if the electrode layer 53 is set as the anode layer, the hydrogen peroxide or peroxide radicals generated at the anode layer by the hydrogen molecules crossing over from the cathode can be effectively scavenged. When constructing the membrane electrode assembly using the solid polymer electrolyte composite membrane containing two or more sheet-like porous reinforcing members in various modes, any person skilled in the art can appropriately determine which of the electrode layers should be set as the cathode layer or the anode layer, based on the teachings of the present application and according to the specific purpose of the membrane electrode assembly.

It is known that when the solid polymer fuel cell is operated continuously for a long period of time, platinum (Pt) in the cathode layer is eluted and converted into platinum ions ($Pt^{2+}$) which migrate toward the anode layer and are reduced by reacting with the hydrogen gas ($H_2$) crossing over from the anode layer, and the platinum (Pt) particles formed by the reduction flocculate at a specific position within the solid polymer electrolyte membrane, forming a platinum band in layer (Japanese Unexamined Patent No. 2006-302578). If such a platinum band is formed, hydrogen peroxide is generated with the oxygen reacting with protons on the platinum particles, and the polymer electrolyte near the platinum band where the peroxide density is high tends to degrade. Japanese Unexamined Patent No. 2006-302578 states that the mixed potential of platinum has a bearing on the position where the platinum band is formed, and claims that the localized generation of hydrogen peroxide in the solid polymer electrolyte membrane can be prevented by controlling the mixed potential and changing the position of the platinum band. The present inventors have discovered that when the fuel cell containing the reinforced solid polymer electrolyte composite membrane according to the present invention is operated continuously, the platinum band is formed near the sheet-like porous reinforcing member. Since the platinum band is formed near the sheet-like porous reinforcing member, the hydrogen peroxide generated due to the presence of the platinum band is quickly decomposed by the peroxide decomposition catalyst contained in the sheet-like porous reinforcing member, and degradation of the solid polymer electrolyte membrane is thus prevented. That is, in the present invention, rather than changing the position of the platinum band, the sheet-like porous reinforcing member containing the peroxide decomposition catalyst is placed in a position where the platinum band is likely to occur, so that the peroxide occurring in that position can be effectively scavenged.

The electrode layer to be used in the membrane electrode assembly according to the present invention is not specifically limited, but any prior known one can be used, as long as it contains catalyst particles and an ion exchange resin. The catalyst usually comprises an electrically conductive material having catalyst particles supported thereon. For the catalyst particles, any material that exhibits catalytic activity for hydrogen oxidation reaction or oxygen reduction reaction can be used, examples including platinum (Pt) and other noble metals, or iron, chromium, nickel, etc., and their alloys. For the electrically conductive material, carbon-based particles, such as carbon black, activated carbon, graphite, etc., are preferable, and among others, fine powdered particles are preferably used. In a typical example, noble metal particles, for example, Pt particles, or alloy particles of Pt and other metal, are carried on carbon black particles having a surface area of 20 $m^2/g$ or larger. In particular, for the anode catalyst, when using a fuel, such as methanol, that generates carbon monoxide (CO) in a side reaction, or when using a gas produced by reforming methane or the like, it is preferable to use alloy particles of Pt and ruthenium (Ru) because Pt alone is easily poisoned by CO. The ion exchange resin in the electrode layer is a material that supports the catalyst and that serves as a binder when forming the electrode layer, and has the role of forming a passage through which ions, etc. formed by catalyst reaction move. For such an ion exchange resin, a similar one to that described earlier in connection with the polymer electrolyte membrane can be used. It is preferable to form the electrode layer in a porous structure to maximize the surface area where the catalyst contacts the fuel gas, such as hydrogen or methanol, on the anode side or the oxidizer gas, such as oxygen or air, on the cathode side. The amount of catalyst contained in the electrode layer is preferably in the range of 0.01 to 1 mg/cm$^2$, and more preferably in the range of 0.1 to 0.5 mg/cm$^2$. The thickness of the electrode layer is generally in the range of 1 to 20 μm, and preferably in the range of 5 to 15 μm.

The membrane electrode assembly used in the solid polymer fuel cell further includes gas diffusion layers. The gas diffusion layer is a sheet member having electrical conductivity and air permeability. A typical example is one prepared by applying water-repellent treatment to an air permeable, electrically conductive substrate such as carbon paper, carbon woven fabric, carbon nonwoven fabric, carbon felt, etc. It is also possible to use a porous sheet formed of carbon-based particles and a fluorine-based resin. For example, use may be made of a porous sheet prepared by molding carbon black into a sheet using polytetrafluoroethylene as a binder. The thickness of the gas diffusion layer is generally in the range of 50 to 500 μm, and preferably in the range of 100 to 200 μm.

The membrane electrode assembly is fabricated by bonding together the electrode layers, gas diffusion layers, and solid polymer electrolyte composite membrane. For the bonding method, any prior known method can be employed, as long as solid bonding having low contact resistance can be accomplished without damaging the polymer electrolyte membrane. In accomplishing the bonding, first the anode electrode or cathode electrode is formed by combining the electrode layer with the gas diffusion layer, and then the electrode is bonded to the polymer electrolyte membrane. For example, an electrode layer-forming coating liquid that contains catalyst particles and an ion exchange resin is prepared using a suitable solvent, and the liquid thus prepared is applied over a gas diffusion layer-forming sheet member, thus forming the anode electrode or cathode electrode, and the resulting structure is bonded to the polymer electrolyte membrane by hot pressing. Alternatively, the electrode layer may first be combined with the polymer electrolyte membrane, and then the gas diffusion layer may be bonded to the electrode layer side. When combining the electrode layer with the polymer electrolyte membrane, a prior known method, such as a screen printing method, a spray coating method, or a decal method, can be used.

A solid polymer fuel cell stack can be assembled by stacking 10 to 100 cells of such membrane electrode assemblies in accordance with a prior known method by interposing a separator plate and a cooling section between each cell and arranging the cells with the anode and cathode of each cell located on the specified sides. The solid polymer fuel cell according to the present invention can also be used as a so-called direct methanol fuel cell that uses methanol as the fuel.

EXAMPLES

The present invention will be described in detail below with reference to examples.

Example 1

A dispersion of a peroxide decomposition catalyst ($CeO_2$) was prepared by mixing 10 parts by mass of cerium oxide sol (manufactured by Daiichi Kigenso Kagaku Kogyo, average particle size: 10 nm, density: 15% by mass), 80 parts by mass of ethanol, and 10 parts by mass of ion exchange water. Next, a porous expanded PTFE membrane (thickness: 8.5 μm, porosity: 80%, average pore size: 0.5 μm, tensile strength: 45 MPa, weight per unit area: 4.0 g/m$^2$) was immersed in the dispersion. After that, the porous expanded PTFE membrane was placed in an oven and dried at 100° C. for 10 minutes, to produce a sheet-like porous reinforcing member containing $CeO_2$. A polymer electrolyte resin solution having an ion exchange capacity of 0.9 meq/g (Nafion (registered trademark) SE-20192 manufactured by DuPont) was applied over an ethylene-tetrafluoroethylene copolymer (ETFE) film to form a coating with a thickness of 200 μm. Next, the sheet-like porous reinforcing member was placed in contact with that coating, to produce an impregnated membrane. The impregnated membrane was then dried in an oven at 140° C. for 5 minutes. After that, the same polymer electrolyte resin solution was applied over the impregnated membrane to a thickness of 200 μm, which was then dried in the oven in the same manner as above, to complete the fabrication of a 40-μm thick solid polymer electrolyte composite membrane reinforced by the porous expanded PTFE membrane.

Example 2

The same polymer electrolyte resin solution as that used in Example 1 was applied over an ETFE film to form a coating with a thickness of 200 μm, which was then dried in an oven at 140° C. for 5 minutes. Next, a mixture was prepared by adding 30 parts by mass of the polymer electrolyte resin solution to 10 parts by mass of the dispersion of the peroxide decomposition catalyst ($CeO_2$) prepared in the same manner as in Example 1. The mixture was applied over the dried coating to form a coating with a thickness of 100 μm, and a porous expanded PTFE membrane (thickness: 8.5 μm, porosity: 80%, average pore size: 0.5 μm, tensile strength: 45 MPa, weight per unit area: 4.0 g/m$^2$) was placed in contact with that coating, to produce an impregnated membrane. The impregnated membrane was then dried in a thermostatic chamber at 140° C. for 5 minutes. After that, the same polymer electrolyte resin solution as that used in Example 1 was applied over the impregnated membrane to a thickness of 100 μm, which was then dried in the thermostatic chamber at 140° C. for 5 minutes in the same manner as above, to complete the fabrication of a 40-μm thick solid polymer electrolyte composite membrane reinforced by the porous expanded PTFE membrane.

Comparative Example 1

A solid polymer electrolyte composite membrane was fabricated in the same manner as in Example 1, except that the porous expanded PTFE membrane was directly used as the sheet-like porous reinforcing member without impregnating it with cerium oxide sol.

Comparative Example 2

A mixture of peroxide decomposition catalyst and polymer electrolyte resin was prepared by adding 10 parts by mass of the dispersion of the peroxide decomposition catalyst ($CeO_2$) prepared in Example 1 and 90 parts by mass of the same polymer electrolyte resin solution as that used in Example 1. The mixture was applied over an ETFE film to form a coating with a thickness of 200 μm, and a porous expanded PTFE membrane (thickness: 8.5 μm, porosity: 80%, average pore size: 0.5 μm, tensile strength: 45 MPa, weight per unit area: 4.0 g/m$^2$) was placed in contact with that coating, to produce an impregnated membrane. The impregnated membrane was then dried in an oven at 140° C. for 5 minutes. After that, the same mixture of the peroxide decomposition catalyst and the polymer electrolyte resin was applied over the impregnated membrane to a thickness of 200 μm, which was then dried in the oven in the same manner as above, to complete the fabrication of a 40-μm thick solid polymer electrolyte composite membrane reinforced by the porous expanded PTFE membrane.

Fabrication and Evaluation of Membrane Electrode Assembly (MEA)

Each solid polymer electrolyte composite membrane fabricated above was cut to a size of 10×10 cm, and an electrode layer (5×5 cm) of PRIMEA 5580 [PRIMEA (registered trademark) manufactured by Japan Gore-Tex] was placed on each side of the membrane. Next, each electrode layer was transferred to the solid polymer electrolyte composite membrane by hot pressing (130° C., 6 minutes), to produce a membrane electrode assembly (MEA) comprising the anode layer, solid polymer electrolyte composite membrane, and cathode layer. Then, the MEA was sandwiched between two gas diffusion layers each formed from 52×52 mm CNW10A [CARBEL (registered trademark) manufactured by Japan Gore-Tex], and the sandwich structure was assembled into a power generating cell and subjected to an open-circuit voltage (OCV) test as an accelerated test. The OCV test was conducted under atmospheric pressure, and hydrogen and air were supplied to the anode and cathode, respectively, at a flow rate of 0.5 L/minute. The cell was held at a temperature of 90° C., and the dew point of the anode gas and cathode gas was 63° C.; in this condition, the cell was operated for 200 hours in an open-circuit condition without generating power, and the change of the voltage was measured during that time. Further, the degree of degradation of the polymer electrolyte membrane was evaluated by comparing the fluorine ion concentration in the drained water in the initial period of the operation with that in the period immediately preceding the end of the operation. More specifically, immediately after the start of the OCV test and 200 hours after the start of the test, the drained water for measuring the fluorine ion concentration was collected by trapping the water draining off through the gas outlet of the cell from both the anode and cathode sides for 10 hours, and the fluorine ion concentration in the drained water was measured using an ion chromatograph (DX320 manufactured by Japan DIONEX) to calculate the amount of fluorine ion elution per unit time and per unit area of the MEA. Further, the fracture strength was measured in accordance with JIS K 7127:1989. A JIS No. 5 specimen was punched out of the solid polymer electrolyte composite membrane by using a punching die. The specimen was then pulled at a rate of 200 mm/minute on a tensile tester with a chuck-to-chuck distance of 80 mm, and the rate of elongation at fracture was measured. The test was conducted in an environment with a temperature of 23° C. and a relative humidity of 50%. Further, the adhesion condition of the anode and cathode layers to the polymer electrolyte membrane was visually inspected. The results of the measurements are shown blow in Table 1.

Example 1 is an example or the solid polymer electrolyte composite membrane fabricated by the first method, in which the peroxide decomposition catalyst is attached to the interior surfaces of the pores of the sheet-like porous reinforcing member. Example 2 is an example of the solid polymer electrolyte composite membrane fabricated by the second method, in which the peroxide decomposition catalyst is dispersed through the polymer electrolyte filled into the pores of the sheet-like porous reinforcing member. In Comparative example 1, the open-circuit voltage significantly dropped after 200 hours, compared with Examples 1 and 2, and the amount of fluorine ion elution in the drained water significantly increased in the initial period of the operation as well as after 200 hours. This is because, in Comparative example 1 which did not contain cerium oxide as the peroxide decomposition catalyst, the polymer electrolyte membrane degraded due to the hydrogen peroxide or peroxide radicals generated at the electrode layer. In Comparative example 2, there was no significant difference observed in the open-circuit voltage as well as in the amount of fluorine ion elution in the drained water, compared with Examples 1 and 2, but the rate of elongation at fracture greatly dropped because the catalyst particles were present over the entire area of the polymer electrolyte membrane. On the other hand, in Examples 1 and 2, it can be seen that hydrogen peroxide, etc., generated at the electrode layer were effectively scavenged because the peroxide decomposition catalyst was contained in the sheet-like porous reinforcing member. Further, in Examples 1 and 2, the surfaces of the solid polymer electrolyte composite membrane were substantially free from irregularities because the polymer electrolyte membrane did not contain the peroxide decomposition catalyst in the form of particles, and therefore, it can be seen that the adhesion of the polymer electrolyte membrane to the electrode layers in the solid polymer fuel cell has improved. Conversely, in Comparative example 2 in which the catalyst particles were present over the entire area of the polymer electrolyte membrane, the electrode layer partially delaminated, exhibiting a poor adhesion condition.

DESCRIPTION OF REFERENCE NUMERALS

10 REINFORCED SOLID POLYMER ELECTROLYTE COMPOSITE MEMBRANE
11 SHEET-LIKE POROUS REINFORCING MEMBER
12 POLYMER ELECTROLYTE MEMBRANE
21 REINFORCING MEMBER BODY
22 PORES
23 PEROXIDE DECOMPOSITION CATALYST
30 REINFORCED SOLID POLYMER ELECTROLYTE COMPOSITE MEMBRANE
31 SHEET-LIKE POROUS REINFORCING MEMBER
32 POLYMER ELECTROLYTE MEMBRANE
40 REINFORCED SOLID POLYMER ELECTROLYTE COMPOSITE MEMBRANE

TABLE 1

| | OPEN-CIRCUIT VOLTAGE [V] | | AMOUNT OF FLUORINE ION ELUTION [μg/hr · cm$^2$] | | | ADHESION OF |
| --- | --- | --- | --- | --- | --- | --- |
| | INITIAL | AFTER 200 HOURS | INITIAL | AFTER 200 HOURS | ELONGATION AT FRACTURE [%] | ELECTRODE LAYER |
| EXAMPLE 1 | 0.99 | 0.99 | 0.04 | 0.06 | 70% | GOOD |
| EXAMPLE 2 | 0.97 | 0.97 | 0.05 | 0.05 | 70% | GOOD |
| COMPARATIVE EXAMPLE 1 | 0.93 | 0.85 | 1.25 | 2.50 | 72% | GOOD |
| COMPARATIVE EXAMPLE 2 | 0.98 | 0.97 | 0.05 | 0.05 | 51% | BAD |

| DESCRIPTION OF REFERENCE NUMERALS | |
|---|---|
| 41 | SHEET-LIKE POROUS REINFORCING MEMBER |
| 42 | POLYMER ELECTROLYTE MEMBRANE |
| 50 | MEMBRANE ELECTRODE ASSEMBLY |
| 51 | SHEET-LIKE POROUS REINFORCING MEMBER |
| 52 | POLYMER ELECTROLYTE MEMBRANE |
| 53 | ELECTRODE LAYER |
| 54 | ELECTRODE LAYER |

What is claimed is:

1. A reinforced solid polymer electrolyte composite membrane for a solid polymer fuel cell having an anode side and a cathode side, comprising two or more polymer electrolyte membranes and one or more layers of a sheet-like porous reinforcing member, wherein said polymer electrolyte membranes provide both said anode side and said cathode side of said composite membrane, and pores in said sheet-like porous reinforcing member are substantially filled with electrolyte from said polymer electrolyte membranes, and wherein said sheet-like porous reinforcing member contains a peroxide decomposition catalyst, wherein said two or more polymer electrolyte membranes have different thicknesses from each other, one thinner and one thicker, and
wherein said thinner polymer electrolyte membrane is on said cathode side.

2. The reinforced solid polymer electrolyte composite membrane as claimed in claim 1, wherein said composite membrane includes said sheet-like porous reinforcing member in two or more layers, at least one of which contains said peroxide decomposition catalyst.

3. The reinforced solid polymer electrolyte composite membrane as claimed in claim 1, wherein said sheet-like porous reinforcing member comprises porous expanded polytetrafluoroethylene.

4. The reinforced solid polymer electrolyte composite membrane as claimed in claim 1, wherein said peroxide decomposition catalyst is attached to surfaces of said sheet-like porous reinforcing member or to interior surfaces of said pores.

5. The reinforced solid polymer electrolyte composite membrane as claimed in claim 1, wherein said peroxide decomposition catalyst is dispersed through said electrolyte filled into the pores of said sheet-like porous reinforcing member.

6. The reinforced solid polymer electrolyte composite membrane as claimed in claim 1, wherein said peroxide decomposition catalyst comprises ions of at least one transition element or rare earth element selected from the group consisting of cerium, manganese, tungsten, zirconium, titanium, vanadium, yttrium, lanthanum, neodymium, nickel, cobalt, chromium, molybdenum, and iron, or at least one compound containing said transition element or rare earth element.

7. The reinforced solid polymer electrolyte composite membrane as claimed in claim 6, wherein said peroxide decomposition catalyst comprises cerium ions or a compound containing cerium.

8. A membrane electrode assembly for use in a solid polymer fuel cell, constructed by bonding a cathode layer to said cathode side of a solid polymer electrolyte composite membrane as claimed in claim 1, and an anode layer to said anode side.

9. The membrane electrode assembly for use in a solid polymer fuel cell as claimed in claim 8, wherein said solid polymer electrolyte composite membrane includes said sheet-like porous reinforcing member in two or more layers, of which at least one layer nearer to said cathode layer contains said peroxide decomposition catalyst.

10. The membrane electrode assembly for use in a solid polymer fuel cell as claimed in claim 8, wherein said solid polymer electrolyte composite membrane includes said sheet-like porous reinforcing member in two or more layers, of which the sheet-like porous reinforcing member nearest to said cathode layer contains said peroxide decomposition catalyst.

11. A solid polymer fuel cell comprising a membrane electrode assembly as claimed in claim 8.

* * * * *